United States Patent [19]

Roy

[11] Patent Number: 4,699,248

[45] Date of Patent: Oct. 13, 1987

[54] COLLAPSIBLE AND PORTABLE OBSERVATION STAND

[76] Inventor: Roch Roy, Case Postale 100, Cap Chat, Comté de Matana, (Québec), Canada, G0J 1E0

[21] Appl. No.: 923,817

[22] Filed: Oct. 27, 1986

[30] Foreign Application Priority Data

May 12, 1986 [CA] Canada ................................. 508926

[51] Int. Cl.[4] .......................................... A01M 31/02
[52] U.S. Cl. .................................. 182/116; 182/187; 182/189
[58] Field of Search ............... 182/187, 116, 107, 108, 182/82, 100, 189, 195

[56] References Cited

U.S. PATENT DOCUMENTS

| 3,220,766 | 11/1965 | Kates | 182/116 |
|---|---|---|---|
| 3,882,964 | 5/1975 | Schellenberg | 182/127 |
| 4,240,521 | 12/1980 | Naka | 182/189 |
| 4,274,508 | 6/1981 | Hughes | 182/116 |
| 4,552,246 | 11/1985 | Thomas | 182/116 |
| 4,592,446 | 6/1986 | White | 182/189 |
| 4,614,252 | 9/1986 | Tarner | 182/187 |

FOREIGN PATENT DOCUMENTS 52084  11/1966  German Democratic Rep. ..................................... 182/189

Primary Examiner—Reinaldo P. Machado
Attorney, Agent, or Firm—Robic, Robic & Associates

[57] ABSTRACT

An observation stand has a rectangular platform acting as a floor and removably secured, at its center, at the upper end of a mast. The latter is made up of a series of cylindrical tubes having generally the same length but decreasing in diameter, from one tube to the next, in order that the tubes may be slid one into the other with, of course, the larger tube on the outside. The mast is mounted by its base on a stake, driven into the ground, by means of a device which allows the mast to pivot with respect to the stake so that the stand may be completely mounted when lying over the ground before being straightened up into vertical position and then fixed in that vertical position. The mast is provided with removable rungs capable of giving access to a trap-door formed on the very platform. The latter is surrounded by a removable guardwall.

17 Claims, 19 Drawing Figures

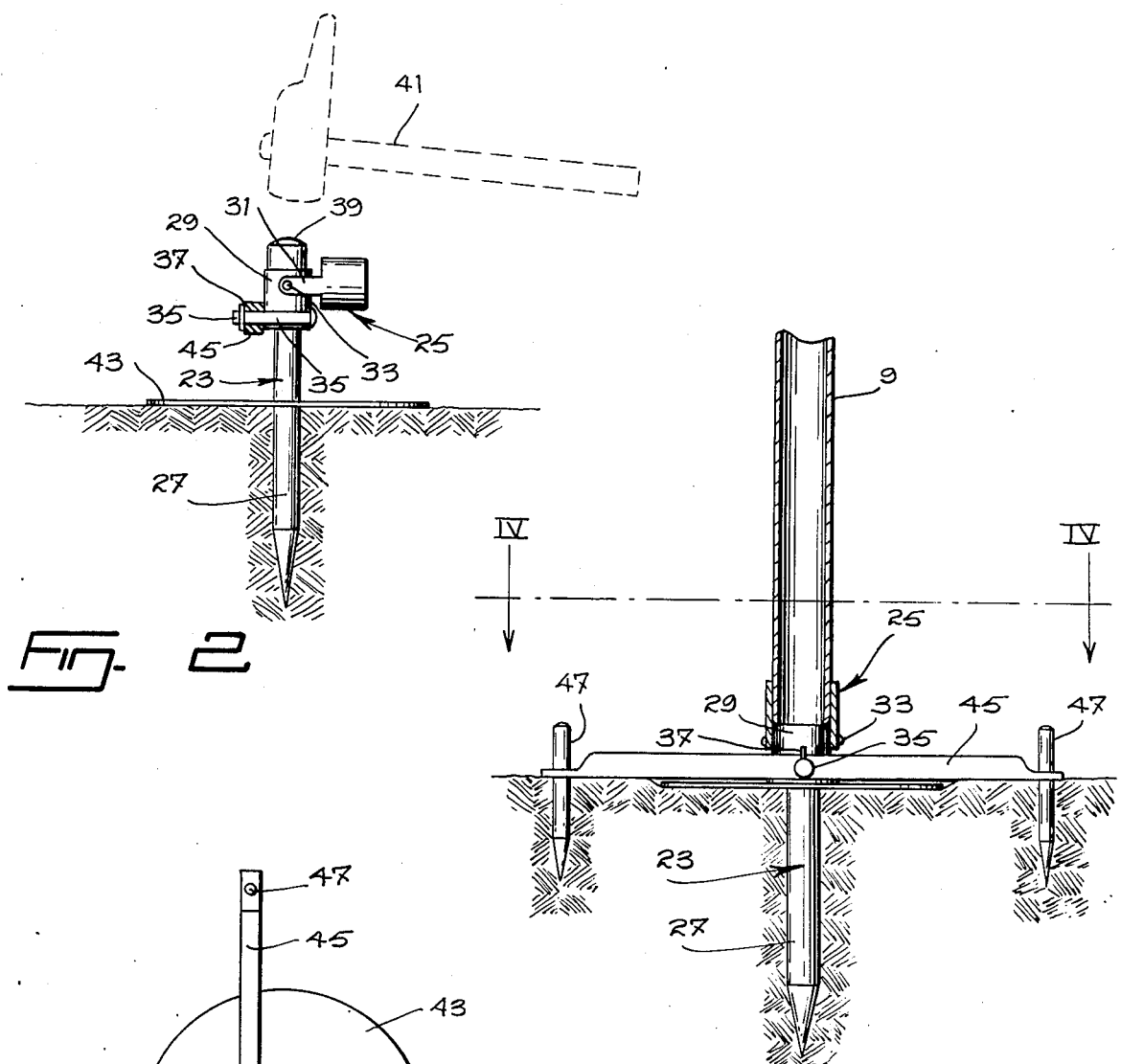
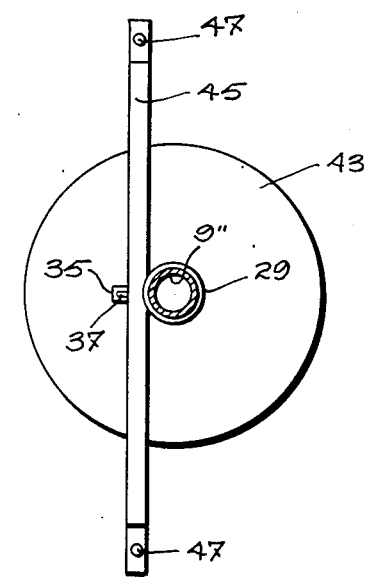

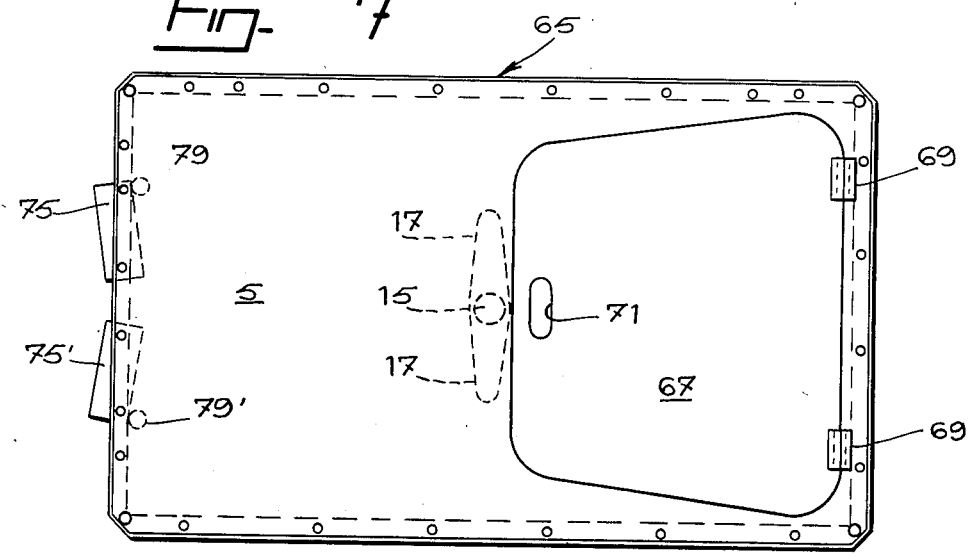
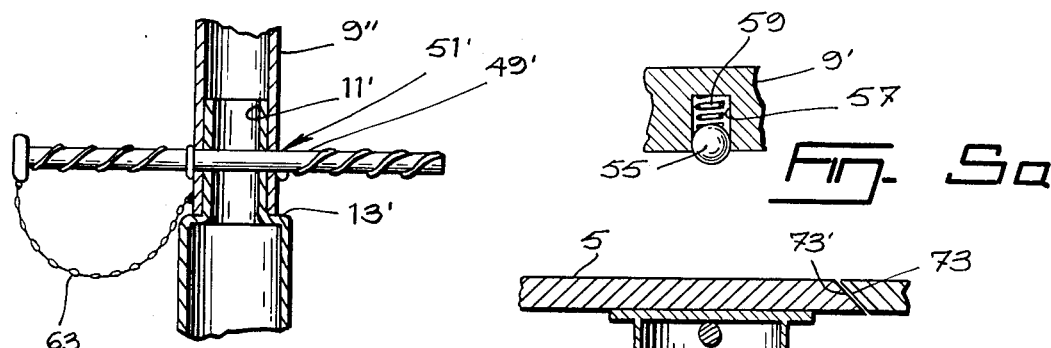
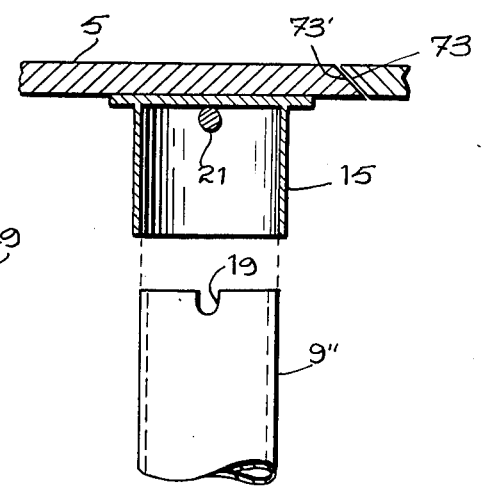
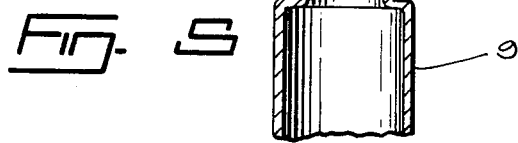

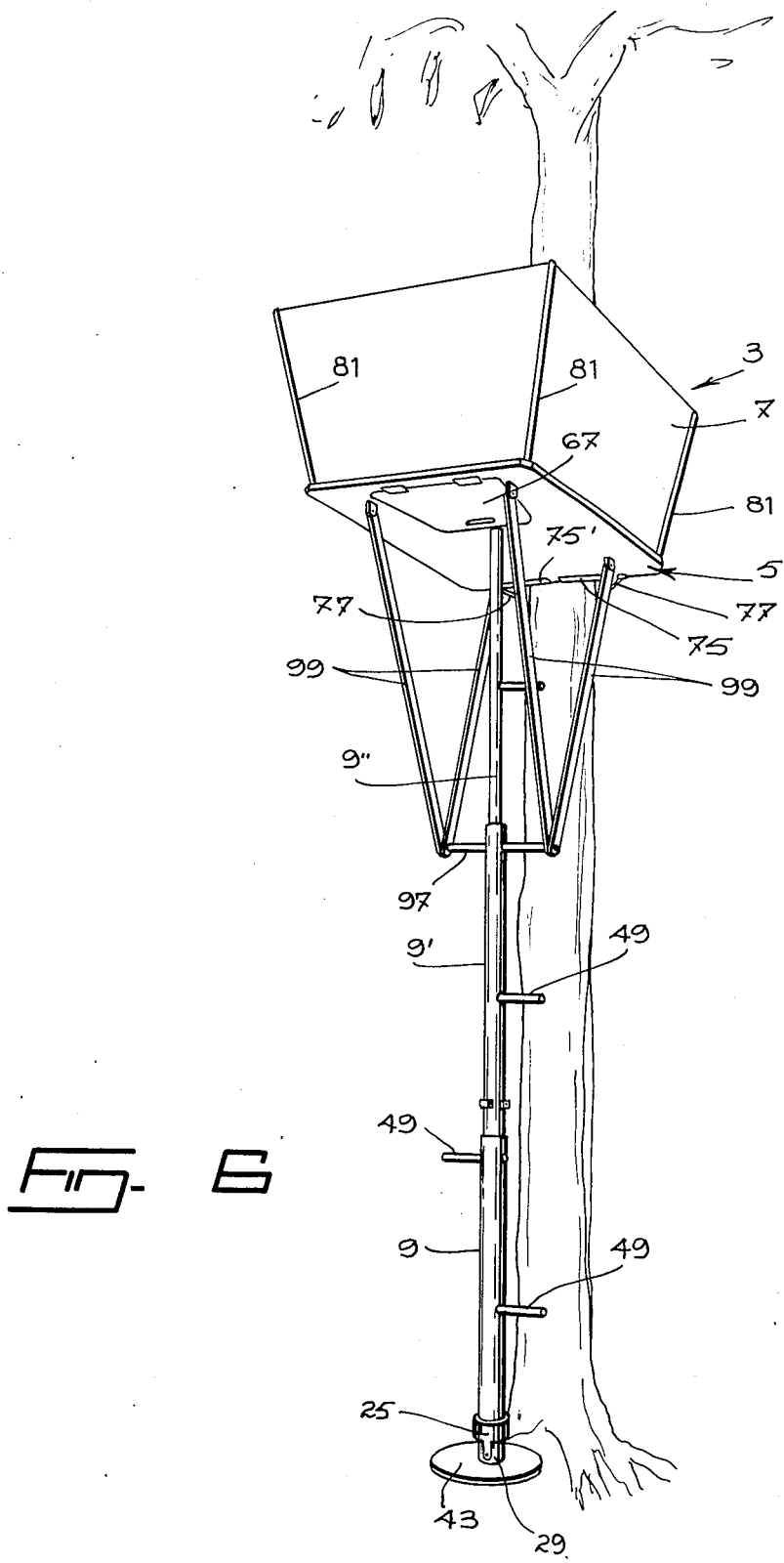

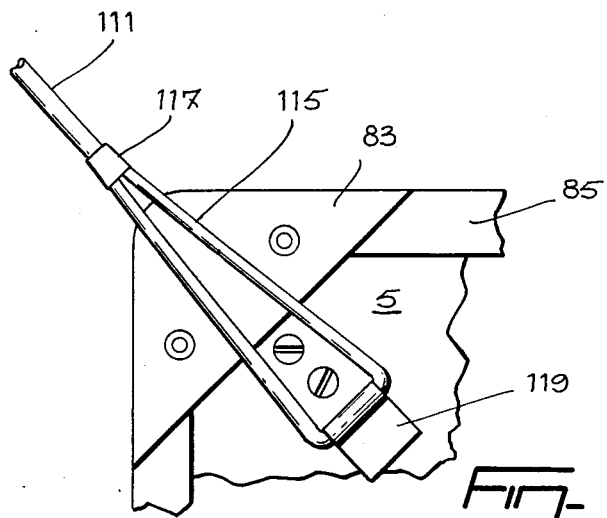
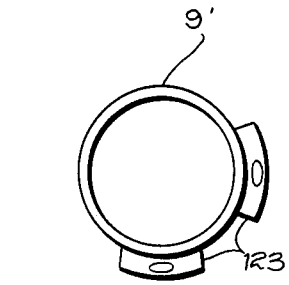
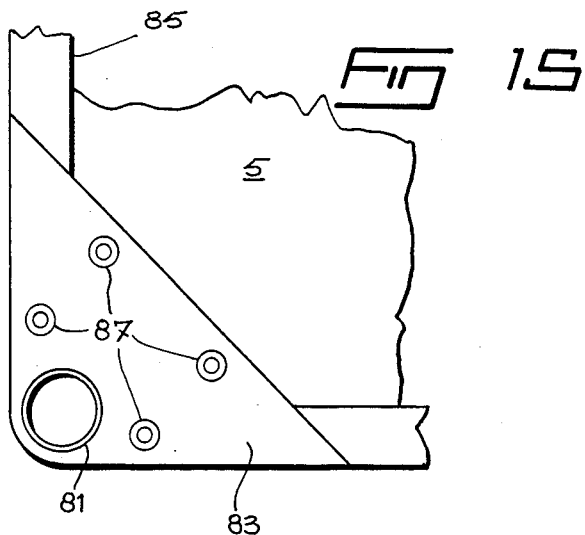
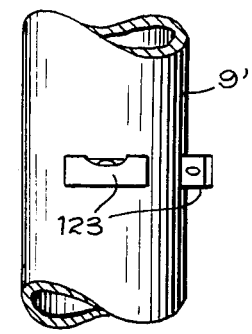
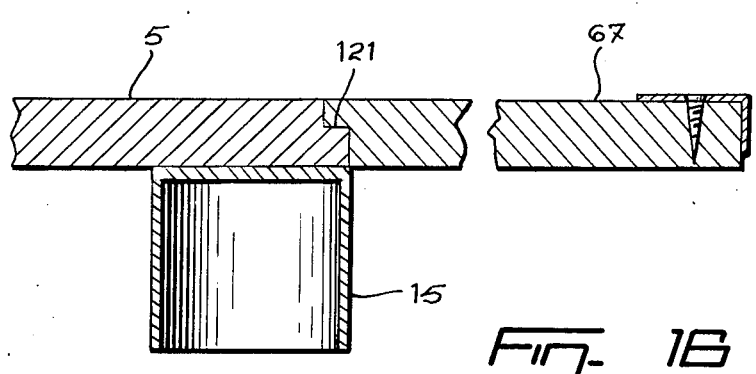

COLLAPSIBLE AND PORTABLE OBSERVATION STAND

The present invention relates to an improved observation stand.

The words "observation stand" as used in the present specification include a platform which is raised from the ground and which may serve as a hiding place for a hunter; as a post for observation, garding and supervision by the police or the army, or yet a raised platform for the radio, motion picture or television photographs or event commentators.

Stands of this type already exist but they are generally of a complex, heavy construction which is difficult to set up and particularly cumbersome when it is necessary to move them from one place to another. These inconveniences are particularly notable if the stand has to be moved in natural terrain where conventional transportation means do not exist or exist very little and where it is necessary to provide for the stand to be mounted, dismounted and transported generally manually.

The major object of the present invention is consequently the provision of a stand of the general type described above which is conceived structurally for easy and fast mounting and more important yet, that it be light and occupy a small volume when dismounted.

The improved observation stand according to the present invention is, for that purpose, essentially formed of a platform which serves as a floor and which is removably secured, at its center, at the upper end of a mast. The latter is made up of a series of cylindrical tubes having generally the same length but of decreasing diameter from one tube to the other so that they may be slid one into the other with the tube having the largest diameter being of course on the outside. In this manner, the dismounted mast may be easily transported and will not be cumbersome. In use, the mast is mounted at its base on a stake which can be driven into the ground by means of a device which allows the mast to pivot with respect to the stake in such a way that the stand can be completely mounted on the ground before being brought into vertical position and then be secured in that position. The mast is provided with rungs that are preferably movable and that serve to give access to a trap-door formed on the platform itself. The latter is preferably surrounded by a removable enclosing wall forming a safety guardwall.

Other features and advantages of the invention will become apparent from the description that follows of preferred embodiments, description having reference to the appended drawings wherein:

FIG. 2 is a side elevation view of the foundation of the stand mast as it is being driven into the ground;

FIG. 3 is a side view in elevation similar to that of FIG. 2 once the foundation has been mounted in position; the lower end of the mast being illustrated in longitudinal cross-section;

FIG. 4 is a cross-sectional view taken along line IV—IV of FIG. 3;

FIG. 5 is a longitudinal cross-section of a portion of the mast;

FIG. 5a is an enlarged view, in cross-section, of a detail of FIG. 5;

FIG. 6 is a perspective view of another embodiment of the invention;

FIG. 7 is a plan view of the upper surface of the enclosure supported by the mast;

FIG. 8 is a partial view, exploded and partially in cross-section, of the upper end of the mast and its junction with the platform;

FIG. 14 is a bottom plan view of a corner of the platform shown in FIG. 10;

FIG. 15 is a top plan view of a corner of the platform of FIG. 10;

FIG. 16 is a cross-sectional view of the central portion of the platform of FIG. 10;

FIG. 17 is a view of a tube of the mast provided with levels, and

FIG. 18 is a side elevation view of the tube of FIG. 17.

Figure 1:
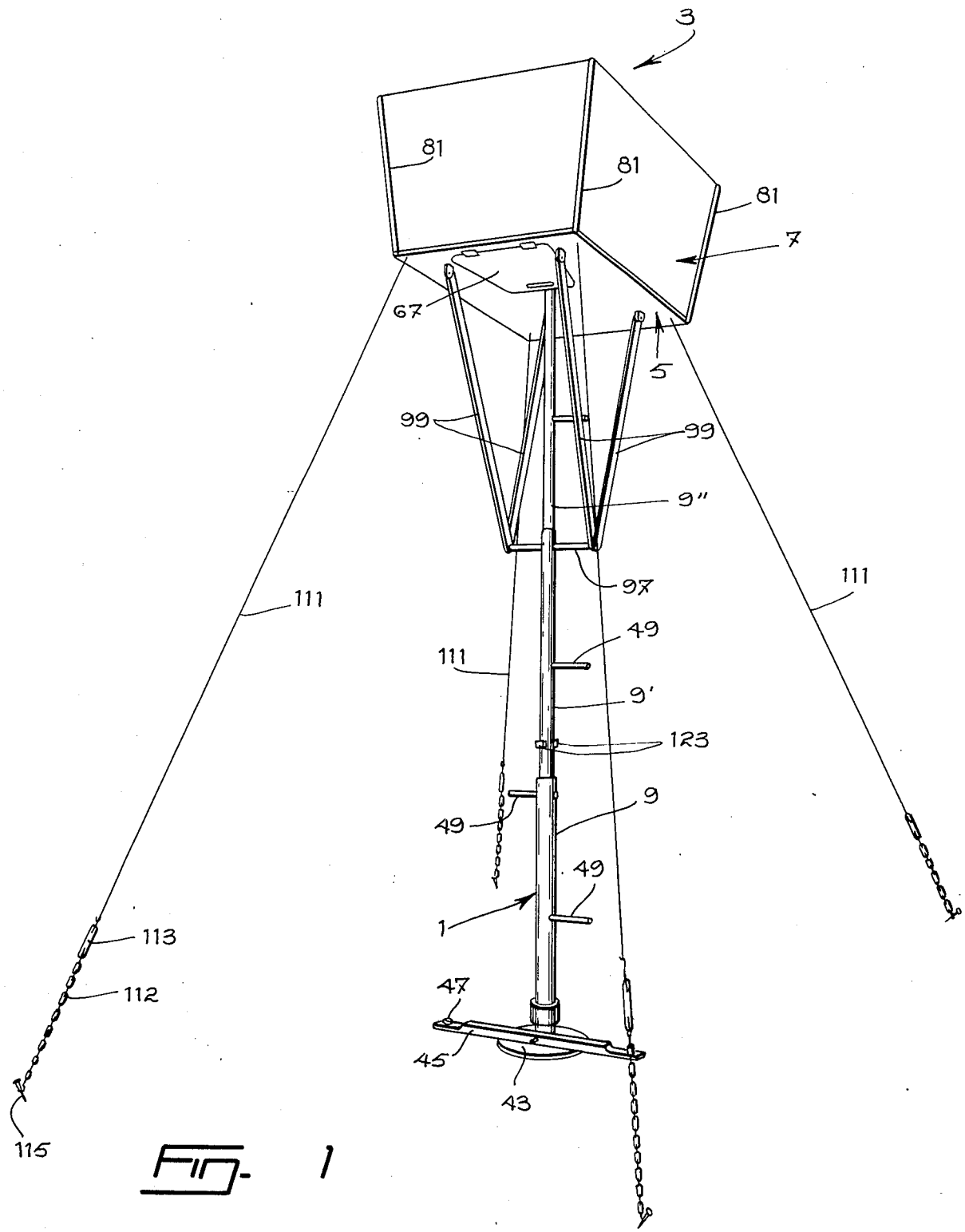
FIG. 1 is a perspective view of a stand comprising the improvements of the invention.

Referring now to the drawings, more particularly to FIGS. 1 to 5, the observation stand comprises essentially a mast 1, acting as a central sole support for an enclosure 3 made up of a platform 5, acting as a floor, and of a guardwall 7 for protecting the users.

The mast 1 is constituted by a group of cylindrical elongated tubes 9, 9', 9", disposed in alignment one after the other. Tubes 9, 9', 9", are essentially of the same length and of uniform diameter for a given tube. However, the diameters of the successive tubes decrease starting with the base tube 9 up to the top tube 9". The diameters are selected to allow, when the stand is dismounted, sliding of the tubes into the base tube 9 so that the thus telescoped tubes be essentially equal in length to the length of a given tube.

As best illustrated in FIG. 5, each tube, along a short distance 11, 11', at the upper end thereof, is narrowed down in diameter to define a shoulder 13, 13', serving as a seat for the tubes 9' and 9" above it. Only the upper tube 9" is not narrowed down for a reason which is given hereinafter.

Means are provided to allow the observation platform 5 to be removably mounted, at its center, by mere sliding action on the upper end of the top tube 9". This possibility is shown in FIGS. 7 and 8. Referring more particularly to FIG. 8, it will be noted that the upper end 9" is intended to freely slide into an inverted cup 15 provided with short wings 17 (see FIG. 7) secured in a known manner on the under surface of the platform 5. It will also be necessary to ensure that the platform 5 does not pivot about the longitudinal axis of the mast 1. Thus, notches 19 may be provided along the periphery of the upper end of tube 9", diametrically opposite one another, into which notches a pin 21 may be lodged, pin 21 being secured at the bottom of the inverted cup 15.

The mast 1 rests upon a foundation more particularly illustrated in FIGS. 2, 3 and 4.

This foundation comprises a stake 23, preferably metallic, pointed at one end in order to be more easily driven into the ground for securement. The foundation likewise comprises a hollow socket 25 having an inner diameter allowing sunggled insertion of the lower end of the base tube 9 as can easily be seen in FIG. 3. This arrangement allows the base tube to sit squarely over the head of the stake 23. Finally, the mast ground foundation assembly comprises means joining the socket 25 to the stake 23 to allow for pivotal movement of the socket 25 and of the mast 1 which it supports, (by insertion of the tube 9 into the socket 25) about a transverse axis of the stake 23. The aforesaid means which form the mast ground foundation assembly thus allow for assembly of the mast 1 and of enclosure 3 (platform 4 and guardwall 7) on the ground, to insert the base tube 9 into the socket 25 when the latter is in the horizontal position illustrated in FIG. 2 and, thereafter, erect the stand to bring it into vertical position.

The stake 23 has a lower portion 27 intended to be driven into the ground and an upper portion 29 over the upper end of which the base tube 9 sits, as illustrated in FIG. 3. FIG. 2 shows that means are provided to join the socket 25 to the stake 23 to allow pivotal of the socket (and thus of the mast 1) with respect to the stake 23. These pivot means comprise arms 31 which are solid with the socket and extend away therefrom. Pivots 33, of any known kind, connect the lower end of the arms 31 to the upper end 29 of the stake 23 to allow the aforesaid swivelling movement of the socket 25.

The upper end 29 of the stake 23 is preferably cylindrical and is partially slid over the top of the lower end 27 of the stake 23, being secured thereto by means of a peg 35 extending across the two parts 27 and 29 of the stake 23, this peg 35 being secured into position by means of a keeper pin 37. As mentionned previously, the upper end 29 of the stake 23 is cylindrical so that it is possible to insert into it, in a removal manner, an anvil 29 which allows, by means of a sledge-hammer 41, to insert the stake 23 into the ground.

The stand also comprises a stabilizer disk 43 intended to rest upon the ground and pierced at its center to allow for the passage of only the lower portion 27 of the stake 23, the upper cylindrical portion 29 of the same stake 23 then resting on the disc 43 about the central opening that allows for the passage of the lower part 27 of the stake 23.

To stabilize the stand further, an anchoring bar 45 for the disc 43 may be provided, the bar 45 bearing against the disc and being pierce at its center to allow for the passage the previously mentioned peg 35, pivoted at 37 as shown in FIG. 2, in particular. Two pegs 47 may solidly fix the bar 45 as well as the disc 43 to the ground by passing through appropriate apertures at the opposite ends of the bar 45, these pegs 47 being obviously located beyond the periphery of the disc 43. For this purpose, it will be an advantage to thin down the bar 45 at its ends as clearly illustrated in FIG. 3.

Each of the tubes 9, 9', 9", of the mast 1 comprises at least one rung 49 of which the preferential shape is given in detail in FIG. 5. Each rung 49 is made up of a rod 51 having a flat head 53 and freely inserted across two diametrically opposite openings of the wall of tube 9'. After mounting, the head 53 bears against the outer wall of the tube 9' whereas the rod 51 is held into position by means of a stop device shown in FIG. 5a. As can be seen, this stop device comprises a ball 55 located in the housing or bore 57 and held under pressure by means of a spring 59, the opening of the housing 57 being obviously slighthly narrower than the diameter of the ball 55 to avoid the latter from escaping out of the said housing 57. This mechanism is provided about the opening of the wall of tube 9' and there will also be provided, on the rod 51, a groove or cavity not shown, into which the ball 55 will rest in locking position of the rod 51. Obviously, other similar stop devices may be used for the above purpose.

To avoid any slipping, the rod 51 may be provided with a helical ridge 61 in which case the openings through the tube 9' will obviously have to be of a diameter slightly greater than that of the rod 51. This latter requirement may be avoided by replacing the ridge 61 by helical furrows grooved on the outer surface of the rod 51.

As shown in FIG. 1, the spacing between the rungs 49 will be adequately spaced to allow the user to climb along the mast 1.

FIG. 5 shows, in option, another type of rung 49' of which the rod 51' extends beyond the tube 9" and on either side thereof. The construction of this rung 49' is essentially the same as that of rung 49 described above. As shown, the rod 51 could be inserted through to extend the rod 51 through the lower end of the tube 9" and, simultaneously, through the narrow portion 11' of the tube 9' located beneath the tube 9".

To avoid that the rungs 51, 51' fall to the ground, should they escape from the position illustrated in FIG. 5, small chains 63 may be provided of which the ends will be removable secured respectively to the rung and to the side wall of the corresponding tube.

The observation stand of FIG. 6 is essentially of the construction as that shown in FIG. 1 except it is intended to bear against a tree and, under these conditions, it is not essential that the stabilizer disc 43 be secured to the ground by means of an anchoring bar 45 as is the case with the observation stand of FIG. 1. On the other hand, it will be necessary to secure the enclosure 3 of the post in a manner which is described hereinafter.

The reference is now made to FIG. 7, which illustrates the floor 5 of the enclosure 3 without however illustrating the guardwall 7; the said floor 5 being made up one-piece panel which could be a plywood panel or which could be made of molded plastic material or fibreglass. The platform 5, serving as a floor, is secured to an outer frame 65 which is a continuous angle-member, the one-piece panel 5 being secured to the horizontal leg of the angle-member by means of screws, for instance, or simply bolted thereto in known fashion.

On one side of the previously mentioned cup-shaped joint 7 (FIG. 8), there will be provided a trap-door 67 hinged at 69 and provided with an elongated oblong hole 71 intended to serve as a handle opening for the trap-door. The latter may be bevelled as at 73, along its periphery, to cooperate with a like bevel 73' provided about the trap-door 67, as illustrated in FIG. 8, to hold the trap-door 67 in closed position.

In the case of the embodiment of FIG. 6, two bearing blocks 75, 75', angularly disposed with respect to the angle-member frame 65, are secured to the latter in any known manner such as the manner in which the floor 5 is secured to the frame 65. These bearing blocks come to rest against the tree, shown in FIG. 6 and the observation stand is held into position by means of cable 77 of which the two ends may be seen in FIG. 6, being secured to hooks 79, 79', projecting beneath the floor 5 (FIG. 7).

Figure 10:
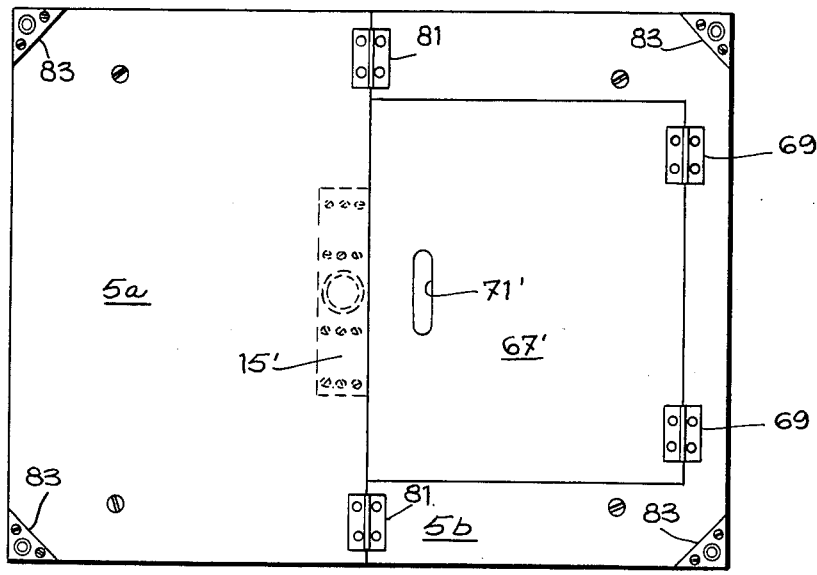
FIG. 10 is a plan view of the platform of FIG. 9.

Alternatively and as illustrated in FIG. 10, the floor 5 may be made of two panels 5a, 5b, having the same size and hinged one to the other at 81 so that they may be folded one over the other to facilitate transportation. The trap-door 67' may be rectangular but, otherwise, the construction is the same as the trap-door 67 of the floor 5 of FIG. 7.

Also shown in the alternative floor construction of FIG. 10, the cup-shaped joint device serving for the mounting of the top tube 9" may be of a different shape as that shown in FIG. 7 but will have essentially the same function, that is mount the floor 5a, 5b, over the joint 15'. According to a particular embodiment, the floor 5a, 5b will not have the peripheral angle-member frame as that which is illustrated at 65 in FIG. 7.

Figure 11:
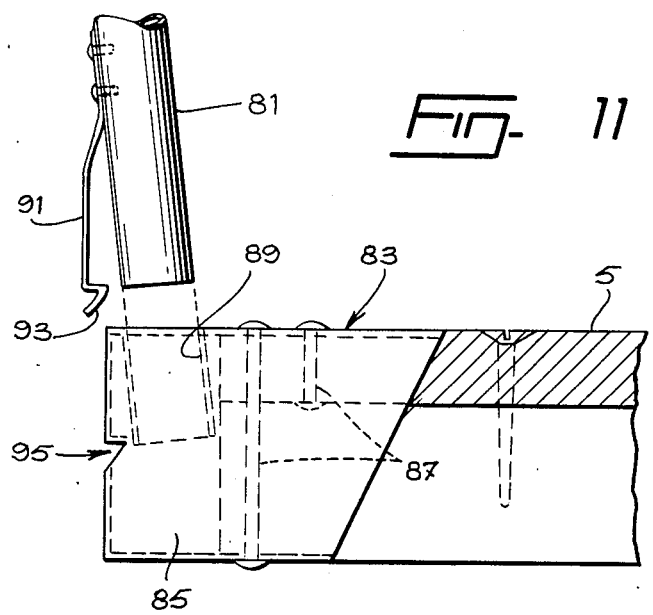
FIG. 11 is an elevation view, partially exploded and in cross-section, of a corner of the platform of FIG. 10.
Figure 12:
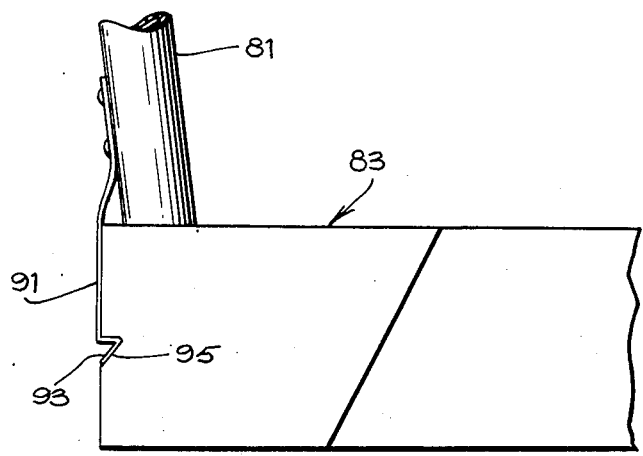
FIG. 12 is a side elevation view of the corner shown in FIG. 11.

The guardwall 7 (FIGS. 1 and 6) may be a canvas wound around upper rods 81 held in removable fashion into corner fasterners 83 provided at each corner of the panels 5a, 5b and illustrated in detail in FIGS. 11 and 12. Each fasterner 83 comprises a metal hollow corner piece secured to the floor 5 by bolts 87. The ends of the cross-pieces 85, secured to the panels 5a, 5b, are housed in these metal hollow corner pieces and the latter as well as the cross-pieces 85, comprise housings of bores 89 into which the lower ends of the upright rods 81 freely slide, as illustrated. Each rod 81 is held into its housing 89 in a removable manner by means of a spring blade 91 having a hooked head 93 coming to lodge into a triangular notch 95 provided in the wall of the fasterner 83 and of the cross-piece 85. FIG. 12 illustrates such an upright rod 81 in a mounted position and it will be seen that it may easily be removed while providing a secure holding as long as the hooked head 93 is inserted into its triangular notch 95.

The canvas serving as a protection wall may be provided, in four corners, with cylindrical passages capable of being slid along the upright rods 81.

Figure 9:
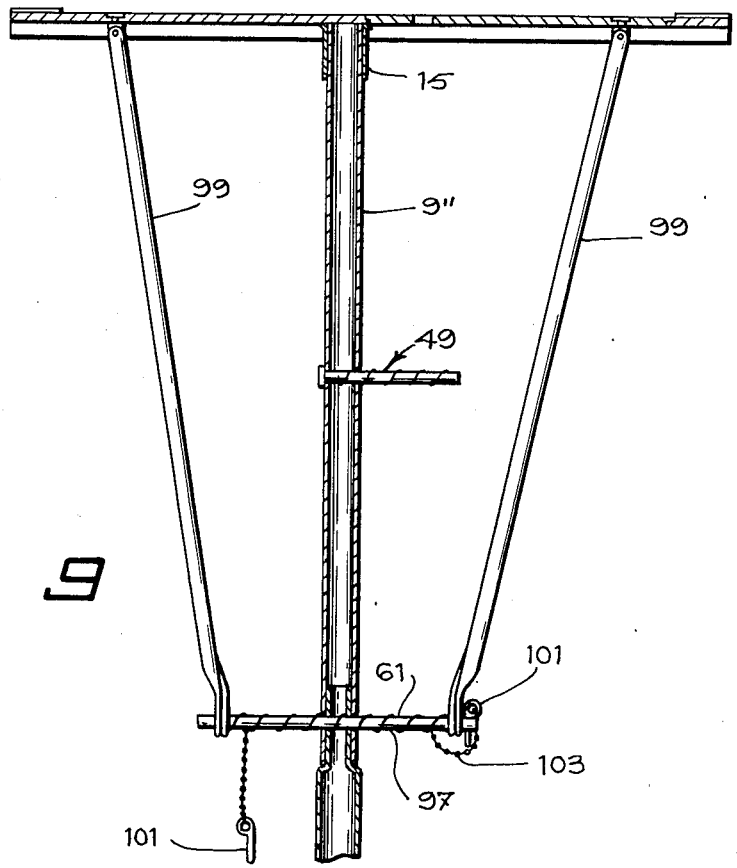
FIG. 9 is a view in elevation and in cross-section of the upper part of the mast and of the platform of the enclosure.
Figure 13:
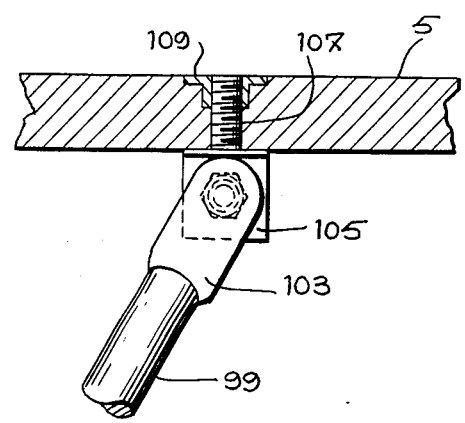
FIG. 13 is a view illustrating the junction between a brace member and the platform to which it is connected, the latter being illustrated in cross-section.

In order to insure great stability to the enclosure 3, once mounted on the mast 1, resort may be add to cross-bracing means such as those illustrated in FIGS. 1 and 6 and more in detail in FIG. 9. These means are made up of a cross-bar 97 extending across the mast 1 in a removable manner and in the same way, for instance, as the rungs 49. In fact, this cross-bar may also serve as rungs and would be provided at an appropriate distance from the bottom of the platform 5. Cross-bar 97 serves as a support, at each of its free ends, to a pair of angle-braces 99, mounted in V, of which the ends forming the apex are mounted in a removable manner on the ends of the cross-bar 97, being held between the end of the helical ridge 61 and a keeper pin 101 inserted in a removable manner through an aperture of the cross-bar 97 and held to the latter by means of a chain 103. Regarding the other ends of the angle-braces 99, they may be removably secured beneath the floor 5 by means of a device similar to that illustrated in FIG. 13. In this case, the angle-brace 99 is flattened out at its end 103 and is inserted between the descending legs of a stirrup member 105 having a bolt 107 screwed across a threaded ring 109 secured to the floor 5. The flattened end 103 is held between the legs of the stirrup 105 by a bolt and nut so as to be easily dismounted. However, the stirrup 105 is retained permanently on the floor 5.

To complete the stability of the installation of FIG. 1, stay devices may be provided at each corner of the enclosure 3, as illustrated in FIG. 1. Each stay comprises a cable 111 secured to the ground by means of a chain 112 and of a turnbuckle 113, the chain being itself secured, at its other end, to a peg 114 obviously driven into the ground. At its other end, and as particularly illustrated in FIG. 14, the cable 111 forms a buckle 115 held by a clamping ring 117, the buckle 115 being inserted into a hook 119 secured beneath the platform 5 in any known manner. It will obviously be understood that the buckle 115 may easily be slid into the hook 119 and be removed therefrom, when the stand is to be dismounted.

FIG. 16 shows a rabbet opening 121 for the trap-door 67 in replacement for the bevels 73, 73', of FIG. 8.

Levels 123, illustrated in FIGS. 17 and 18, may be used in the central tube 9' of the mast 1 to ensure its verticality.

What I claim is:

1. Observation stand capable of being easily and rapidly assembled and dismounted as well as capable of making up, when dismounted, a packing of restricted volume, stand essentially comprising:

a single central support mast including a plurality of elongated cylindrical tubes arranged in co-axial alignment one after the other; the said tubes having essentially the same predetermined length with each tube having a uniform cross-sectional diameter but wherein the diameters of successive tubes decrease, starting from a base tube up to a top tube; the said diameters being selected to allow, when the stand is dismounted, sliding of the tubes into said base tube so that the thus telescoped tubes be essentially equal in length to said predetermined length; each tube, along a short distance at the upper end thereof, being narrowed down in diameter to define a shoulder acting as a seat for the tube connected thereto;

an observation platform and means at the center thereof for removably mounting said platform, by mere sliding action, on the upper end of said upper tube;

foundation forming means for said post comprising: a stake to be fixed into the ground; a hollow cylindrical socket having an inner diameter allowing snug insertion of the lower end of said base tube for seating the said base tube over said stake; and means joining said socket to said stake for allowing pivotal movement of said socket and of said mast about an axis transverse to said stake;

whereby said mast of said platform may be assembled on the ground; said base tube inserted into said socket and, thereafter, said stand moved into a vertical position; said stand additionally comprising:

means maintaining said mast into vertical position.

2. An observation stand according to claim 1, wherein the said stake comprises a lower portion drivable into the ground and an upper portion over the upper end of which the base tube seats; the said means joining the socket and the stake comprising arms solid with the socket and pivot means joining the said arms to the said upper portion of said stake to allow the said pivotal movement of the said socket and of the said mast with respect to the said stake.

3. An observation stand according to claim 2, wherein the upper portion of said stake is cylindrical and is partially slid over the lower portion of said stake, being secured thereto by means of a peg extending across the said two stake portions, the said peg being held in place by means of a keeper pin.

4. An observation stand according to claim 3, further comprising a stabilization disc intended to rest upon the ground and having an opening at the center thereof to allow passage of the lower portion only of said stake, the upper cylindrical end of said stake resting upon the said stabilization disc.

5. An observation stand according to claim 4, further comprising a bar for anchoring said disc upon the ground, the said bar being directly applied over the said disc and being provided at the center with an opening allowing passage of said peg, and means provided at opposite ends of said bar to secure said bar to the ground, the aforesaid means being provided beyond the periphery of the said stabilization disc.

6. An observation stand according to claim 1, comprising at least one rung on each of said mast tubes, and means holding said rungs removably on said mast tubes.

7. An observation stand according to claim 1, comprising at least one rung on each of said mast tubes, and means holding the said rungs removable on said mast tubes, and wherein said means mounting said platform on said mast comprise: an inverted cup-shaped joint into which the upper end of said top tube slidably fits; means securing said joint beneath said platform and additional means provided on said joint and on said top tube to prevent relative rotation between said joint and said top tube.

8. An observation stand according to claim 1, wherein the said means mounting the said platform on the said mast comprise: an inverted cup-shaped joint into which the upper end of said top tube is slidably inserted; means securing said joint beneath said platform and additional means provided on said joint and on said top tube to prevent any relative rotation between said joint and said top tube, and wherein said platform is provided with a hinged trap-door device defining an opening giving access to said platform.

9. An observation stand according to claim 8, wherein the said platform is a one-piece planar and rectangular member.

10. A stand according to claim 8, wherein the said platform comprises two rectangular members hinged to one another and foldable one over the other.

11. A stand according to claim 8, including cross-bracing means joining said platform and said mast and comprising: a bar extending removable across said mast at a predetermined distance from said platform and acting as support on either side of said mast; and, at each free end of said supports, a pair of cross-braces arranged in V of which the ends forming the apex of said V are mounted removably on one of said free ends and of which the opposite ends are secured removably to two of the four corners of said platform, and further comprising stay wires intended to connect the said four corners of said platform to the ground.

12. An observation stand according to claim 9, including cross-bracing means joining said platform and said mast and comprising: a bar extending removable across said mast at a predetermined distance from said platform and acting as support on either side of said mast; and, at each free end of said supports, a pair of cross-braces arranged in V of which the ends forming the apex of said V are mounted removably on one of said free ends and of which the opposite ends are secured removably to two of the four corners of said platform, and further comprising stay wires intended to connect the said four corners of said platform to the ground.

13. An observation stand according to claim 8, including cross-bracing means joining said platform and said mast and comprising; a bar extending removable across said mast at a predetermined distance from said platform and acting as support on either side of said mast; and, at each free end of said supports, a pair of cross-braces arranged in V of which the ends forming the apex of said V are mounted removably on one of said free ends and of which the opposite ends are secured removably to two of the four corners of said platform, and further comprising stay wires intended to connect the said four corner of said platform to the ground, further comprising stay wires joining the four corners of the platform to the ground.

14. An observation stand according to claim 9, including cross-bracing means joining said platform and said mast and comprising: a bar extending removable across said mast at a predetermined distance from said platform and acting as support on either side of said mast; and, at each free end of said supports, a pair of cross-braces arranged in V of which the ends forming the apex of said V are mounted removably on one of said free ends and of which the opposite ends are secured removably to two of the four corners of said platform, and further comprising stay wires intended to connect the said four corners of said platform to the ground, further comprising stay wires joining the four corners of the platform to the ground.

15. Observation stand capable of being easily and rapidly assembled and dismounted as well as capable of making up, when dismounted, a packing of restricted volume, stand essentially comprising:

a single central support mast including a plurality of elongated cylindrical tubes arranged in co-axial alignment one after the other; the said tubes having essentially the same predetermined length with each tube having a uniform cross-sectional diameter but wherein the diameters of successive tubes decrease, starting from a base tube up to a top tube; the said diameters being selected to allow, when the stand is dismounted, sliding of the tubes into said base tube so that the thus telescoped tubes be essentially equal in length to said predetermined length; each tube, along a short distance at the upper end thereof, being narrowed down in diameter to define a shoulder acting as a seat for the tube connected thereto;

an observation platform and means at the center thereof for removably mounting said platform, by mere sliding action, on the upper end of said upper tube;

foundation forming means for said post comprising: a stake to be fixed into the ground; a hollow cylindrical socket having an inner diameter allowing snug insertion of the lower end of said base tube for seating the said base tube over said stake; and means joining said socket to said stake for allowing pivotal movement of said socket and of said mast about an axis transverse to said stake;

whereby said mast of said platform may be assembled on the ground, said base tube inserted into said socket and, thereafter, said stand moved into a vertical position; said stand additionally comprising:

means maintaining said mast into vertical position;

wherein the said stake comprises a lower portion drivable into the ground and an upper portion over the upper end of which the base tube seats; the said means joining the socket and the stake comprising arms solid with the socket and pivot means joining the said arms to the said upper portion of said stake to allow the said pivotal movement of the said socket and of the said mast with respect to the said stake;

wherein the upper portion of said stake is cylindrical and is partially slid over the lower portion of said stake, being secured thereto by means of a peg extending across the said two stake portions, the said peg being held in place by means of a keeper pin;

comprising at least one rung on each of said mast tubes, and means holding the said rungs removable on said mast tubes, and wherein said means mounting said platform on said mast comprise: an inverted cup-shaped joint into which the upper end of said top tube slidably fits; means securing said joint beneath said platform and additional means provided on said joint and on said top tube to prevent relative rotation between said joint and said top tube; and including cross-bracing means joining said platform and said mast and comprising: a bar extending removable across said mast at a predetermined distance from said platform and acting as support on either side of said mast; and, at each free end of said supports, a pair of cross-braces arranged in V on which the ends forming the apex of said V are mounted removably on one of said free ends and of which the opposite ends are secured removably to two of the four corners of said platform, and further comprising stay wires intended to connect the said four corners of said platform to the ground.

16. A stand according to claim 15, wherein said platform is a one-piece planar rectangular member.

17. A stand according to claim 15, wherein said platform comprises two rectangular members hinched to one another so as to be foldable one over the other.

* * * * *